US011880172B2

(12) United States Patent
Huang et al.

(10) Patent No.: US 11,880,172 B2
(45) Date of Patent: Jan. 23, 2024

(54) DISPLAY METHOD, APPARATUS, SMART WEARABLE DEVICE AND STORAGE MEDIUM

(71) Applicant: Anhui Huami Information Technology Co., Ltd., Anhui FTZ (CN)

(72) Inventors: Wang Huang, Anhui FTZ (CN); Pengtao Yu, Anhui FTZ (CN); Kongqiao Wang, Anhui FTZ (CN)

(73) Assignee: Anhui Huami Information Technology Co., Ltd., Anhui FTZ (CN)

( * ) Notice: Subject to any disclaimer, the term of this patent is extended or adjusted under 35 U.S.C. 154(b) by 162 days.

(21) Appl. No.: 17/514,544

(22) Filed: Oct. 29, 2021

(65) Prior Publication Data
US 2022/0121158 A1   Apr. 21, 2022

Related U.S. Application Data

(63) Continuation of application No. PCT/CN2020/089206, filed on May 8, 2020.

(30) Foreign Application Priority Data

May 8, 2019  (CN) .......................... 201910381114.8

(51) Int. Cl.
*G04G 9/00*  (2006.01)
*G06F 1/16*  (2006.01)
*G06F 3/16*  (2006.01)

(52) U.S. Cl.
CPC ........... *G04G 9/0088* (2013.01); *G04G 9/007* (2013.01); *G06F 1/163* (2013.01); *G06F 3/167* (2013.01)

(58) Field of Classification Search
CPC ...... G04G 9/0088; G04G 9/007; G06F 1/163; G06F 3/167
See application file for complete search history.

(56) References Cited

U.S. PATENT DOCUMENTS

2013/0132845 A1* 5/2013 Tammi ................. G01S 3/8006
                                                    715/728
2014/0378185 A1* 12/2014 Chung .................... G06F 1/163
                                                    455/557
(Continued)

FOREIGN PATENT DOCUMENTS

CN      104850317 A      8/2015
CN      106446728 A      2/2017
(Continued)

OTHER PUBLICATIONS

International Search Report for International Application No. PCT/CN2020/089206 dated Aug. 13, 2020.

*Primary Examiner* — Mary Ellen Bowman
(74) *Attorney, Agent, or Firm* — Young Basile Hanlon & MacFarlane, P.C.

(57) ABSTRACT

Provided are a display method and apparatus, a smart wearable device, and a computer-readable storage medium, the display method being used on the smart wearable device, and the smart wearable device including at least two screen display regions and at least two corresponding audio collection units; when a user is wearing the smart wearable device, the screen display regions are not simultaneously in the same plane. The display method includes according to voice signals collected by all of the audio collection units, determining an audio collection unit nearest a sound source; turning on a screen display region corresponding to the audio collection unit nearest the sound source to display current content.

20 Claims, 8 Drawing Sheets

(56) References Cited

U.S. PATENT DOCUMENTS

2015/0185874 A1* 7/2015 Raffa .................... G06F 3/0487
　　　　　　　　　　　　　　　　　　　　345/158
2015/0222742 A1* 8/2015 Son ........................ H04B 1/385
　　　　　　　　　　　　　　　　　　　　455/566

FOREIGN PATENT DOCUMENTS

| CN | 206759435 U | | 12/2017 | | |
|---|---|---|---|---|---|
| CN | 104247383 B | * | 7/2018 | ........... | G06F 1/1626 |
| CN | 108989552 A | | 12/2018 | | |
| CN | 110187758 A | | 8/2019 | | |
| WO | WO-2015060230 A1 | * | 4/2015 | ............. | G06F 1/163 |

* cited by examiner

DISPLAY METHOD, APPARATUS, SMART WEARABLE DEVICE AND STORAGE MEDIUM

CROSS-REFERENCE TO RELATED APPLICATION(S)

The present application is a continuation of International (PCT) Patent Application No. PCT/CN2020/089206 filed on May 8, 2020 which claims foreign priority to Chinese Patent Application No. 201910381114.8 filed on May 8, 2019, the contents of both of which are hereby incorporated by reference in their entireties.

TECHNICAL FIELD

The present disclosure relates to the technical field of wearable devices, and in particular, to a display method and apparatus, a smart wearable device, and a computer-readable storage medium.

BACKGROUND

With the development of wearable technologies, wearable devices, such as bracelets, watches, armbands, or wristbands, are playing an increasingly important role in people's mobile life, and the consequent demand for "reversed transmission of the pressure" is also vigorously promoting the further development of wearable technologies. This is reflected not only in new sensor technologies and biometric algorithms, but also in the interaction of wearable devices.

From an application point of view, wearable devices are currently mainly used in subdivided fields such as sports and health. In addition, there is a growing demand for wearable devices with communication functions in the mobile market recently. Therefore, a wearable device is generally provided with a corresponding screen, which can provide the function of displaying or executing corresponding content based on a user's touch operation, thereby achieving the interaction with the user.

However, the screen of the wearable device is often disposed at a fixed position of the wearable device. When the user wants to view any content on the wearable device and if the current screen is not within a sight range of the user, the user needs to manually adjust the screen of the wearable device to be within the sight range to operate, which affects the use experience of the user.

SUMMARY

The present disclosure provides a display method and apparatus, a smart wearable device, and a computer-readable storage medium.

According to a first aspect of embodiments of the present disclosure, a display method is provided, wherein the display method is applied to a smart wearable device, and the smart wearable device includes at least two screen display regions and at least two corresponding audio collection units; when a user is wearing the smart wearable device, the screen display regions are not simultaneously in the same plane; the display method includes: according to voice signals collected by all of the audio collection units, determining an audio collection unit nearest a sound source; and turning on a screen display region corresponding to the audio collection unit nearest the sound source to display current content.

Optionally, the according to voice signals collected by all of the audio collection units, determining an audio collection unit nearest to a sound source includes: respectively calculating a preset parameter of the voice signal collected by each audio collection unit, the preset parameter being a parameter related to the energy of the voice signal or a parameter related to the amplitude of the voice signal; and determining the audio collection unit nearest the sound source according to the preset parameter.

Optionally, the determining the audio collection unit nearest the sound source according to the preset parameter includes: if the value of the preset parameter corresponding to the audio collection unit is greater than a preset threshold and has the largest difference from the preset threshold, determining the audio collection unit as the audio collection unit nearest the sound source.

Optionally, after the determining an audio collection unit nearest a sound source, the display method further includes: performing voice recognition on the voice signal collected by the audio collection unit nearest the sound source to obtain voice information; wherein the turning on a screen display region corresponding to the audio collection unit nearest the sound source includes: according to the voice information, determining whether to turn on the screen display region corresponding to the audio collection unit nearest the sound source.

Optionally, the according to the voice information, determining whether to turn on the screen display region corresponding to the audio collection unit nearest the sound source includes: if the voice information matches preset text information, turning on the corresponding screen display region; and if the voice information does not match the preset text information, not turning on the corresponding screen display region.

Optionally, the smart wearable device further includes an inertial sensor; wherein the display method further includes: obtaining a target action of a user by means of measurement data collected by the inertial sensor; and determining a display direction of the current content according to the target action, to adjust the current content based on the display direction, the display direction being a horizontal direction or a vertical direction.

According to a second aspect of the embodiments of the present disclosure, an apparatus is provided, wherein the apparatus is applied to a smart wearable device, and the smart wearable device includes at least two screen display regions and at least two corresponding audio collection units; when a user is wearing the smart wearable device, the screen display regions are not simultaneously in the same plane; the display apparatus includes a target determination module and a screen turning on module; the audio collection units are configured to collect voice signals; the target determination module is configured to determine, according to the voice signals collected by all of the audio collection units, an audio collection unit nearest a sound source; and the screen turning on module is configured to turn on a screen display region corresponding to the audio collection unit nearest the sound source to display current content.

Optionally, the target determination module includes: a parameter calculation unit configured to respectively calculate a preset parameter of the voice signal collected by each audio collection unit, the preset parameter being a parameter related to the energy of the voice signal or a parameter related to the amplitude of the voice signal; and a target determination unit configured to determine the audio collection unit nearest the sound source according to the preset parameter.

Optionally, the target determination unit is specifically configured to: if the value of the preset parameter corresponding to the audio collection unit is greater than a preset threshold and has the largest difference from the preset threshold, determine the audio collection unit as the audio collection unit nearest the sound source.

Optionally, the display apparatus further includes: a voice recognition module configured to perform voice recognition on the voice signal collected by the audio collection unit nearest the sound source to obtain voice information; wherein the screen turning on module is specifically configured to: according to the voice information, determine whether to turn on the screen display region corresponding to the audio collection unit nearest the sound source.

Optionally, the screen turning on module includes: a screen turning on unit configured to, if the voice information matches preset text information, turn on the corresponding screen display region; and a screen darkening unit configured to, if the voice information does not match the preset text information, not turn on the corresponding screen display region.

Optionally, the smart wearable device further includes an inertial sensor; wherein the display apparatus further includes: a target action obtaining module configured to obtain a target action of a user by means of measurement data collected by the inertial sensor; and a content display direction adjustment module configured to determine a display direction of the current content according to the target action, to adjust the current content based on the display direction, the display direction being a horizontal direction or a vertical direction.

According to a third aspect of the embodiments of the present disclosure, a smart wearable device is provided, including: a processor; a storage configured to store instructions executable by the processor; and at least two screen display regions and at least two corresponding audio collection units; wherein the audio collection units are configured to collect voice signals; and the processor is configured to perform operations in the foregoing display method.

According to a fourth aspect of the embodiments of the present disclosure, a computer-readable storage medium having a computer program stored thereon is provided, which, when executed by one or more processors, causes the processors to perform operations in the display method as stated above.

The technical solutions provided in the embodiments of the present disclosure may include the following beneficial effects.

In the present disclosure, the smart wearable device is provided with at least two screen display regions and at least two corresponding audio collection units, so that when the audio collection units collect voice signals of a user, the smart wearable device can determine an audio collection unit nearest a sound source according to the voice signals collected by all of the audio collection units, then turns on a screen display region corresponding to the audio collection unit nearest the sound source to display current content. The embodiments of the present disclosure realize a process of automatically turning on a screen by sensing of orientation of a user based on sound, without requiring the user to manually adjust the screen position, so that the use experience of the user is further improved.

It should be understood that the foregoing general description and the following detailed description are merely examples and explanatory, and are not intended to limit the present disclosure.

BRIEF DESCRIPTION OF DRAWINGS

The accompanying drawings here, which are incorporated into the specification and constitute a part of the specification, illustrate embodiments that conform to the present disclosure and are used together with the specification to explain the principles of the present disclosure.

DETAILED DESCRIPTION

Example embodiments will be described here in detail, and examples thereof are represented in the accompanying drawings. When the following description relates to the accompanying drawings, unless otherwise indicated, the same numbers in different accompanying drawings represent the same or similar elements. The implementations described in the following example embodiments do not represent all implementations consistent with the present disclosure. Conversely, they are merely examples of apparatuses and methods consistent with some aspects of the present disclosure as detailed in the appended claims.

Terms used in the present disclosure are merely for describing specific embodiments and are not intended to limit the present disclosure. The singular forms "a," "said," and "the" used in the present application and the appended claims are intended to include the plural form, unless the context clearly indicates otherwise. It should also be understood that the term "and/or" used herein refers to and includes any or all possible combinations of one or more associated listed terms.

It should be understood that although terms "first," "second," "third," and the like may be used in the present disclosure to describe various information, the information should not be limited to these terms. These terms are only used for distinguishing information of the same type. For example, without departing from the scope of the present disclosure, first information may also be referred to as second information, and similarly the second information may also be referred to as the first information. Depending on the context, for example, the term "if" used herein may be explained as "when" or "while," or "in response to a determination."

The screen of a smart wearable device in the related art is usually disposed at a fixed position of the smart wearable device, when a user wants to view any content from the smart wearable device, if the current screen is not within a sight range of the user, the user needs to manually adjust the screen of the smart wearable device to be within the sight range to operate, which affects the use experience of the user.

Therefore, to solve the problems in the related art, embodiments of the present disclosure provide a display method. The display method in the embodiments of the present disclosure can be applied to a wearable device (also referred to herein as a "smart" wearable device). The smart wearable device may be a device that can be worn on a human body such as a bracelet, a watch, a wristband, an armband, a chest strap, a finger ring, or a toe ring, etc.

Figure 1A:
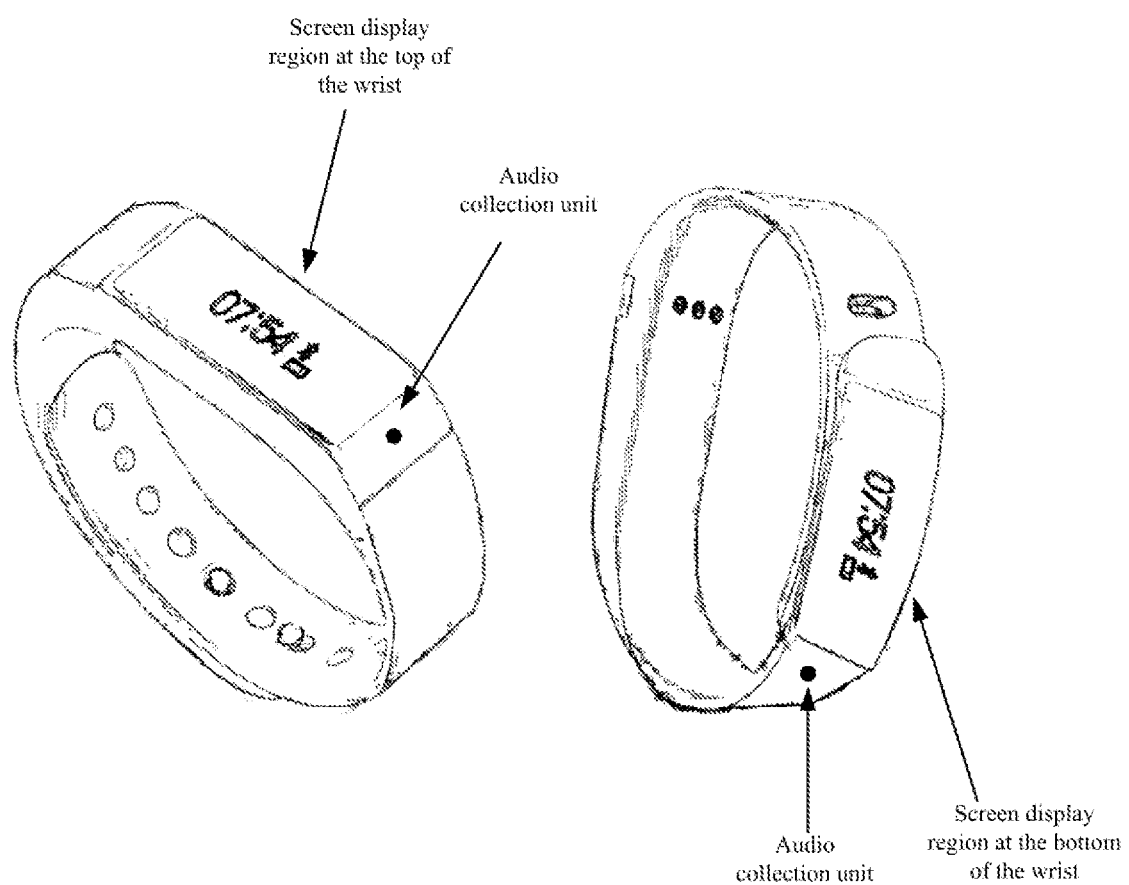
FIG. 1A is a schematic diagram of a smart wearable device according to an example embodiment of the present disclosure.

Referring to FIG. 1A, taking the smart wearable device being a bracelet (also referred to as a wristband) as an example for description, the smart wearable device includes at least two screen display regions and at least two audio collection units. The present disclosure does not impose any limitations to the specific forms of the screen display regions. Each screen display region may be an independent display screen, thus the smart wearable device may include a screen made of at least two independent display screens and has a plurality of display regions. Alternatively, the smart wearable device may include a display screen, and the display screen may include a plurality of display regions. The screen display regions can correspond one-to-one to the audio collection units, respectively. When the screen display regions are independent display screens, the audio collection units may be disposed around the screen display regions. For example, the audio collection units are disposed at any positions that are not greater than a preset distance threshold (such as 1 cm, 1.1 cm, or 1.2 cm, for example) from the screen display regions. When each screen display region is one of the screen displays, the audio collection units may be disposed at side edges of the wristband corresponding to the screen display regions (surfaces other than the upper and lower surfaces of the wristband). It can be understood that the embodiments of the present disclosure do not impose any limitations to the specific types of the screen display regions and the audio collection apparatuses, which can be specifically set according to actual situations. For example, the screen material of the screen display regions may be a flexible screen material with expandability, and the audio collection units may be microphones, pick-ups, or the like.

Figure 1B:
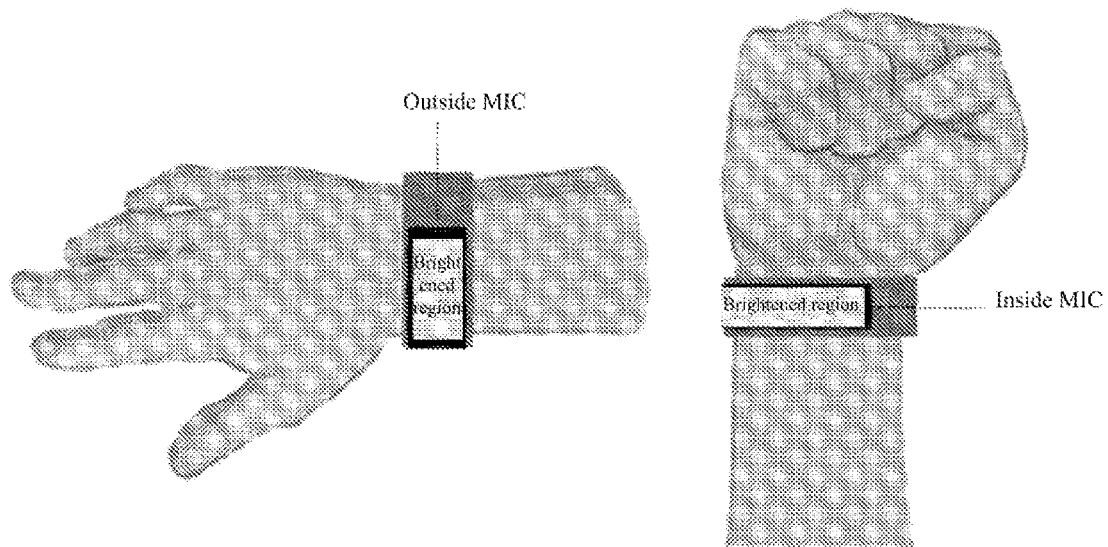
FIG. 1B is a schematic diagram of wearing a smart wearable device by a user according to an example embodiment of the present disclosure.

It should be noted that in order to reduce cumbersome operations of manually adjusting the screen display regions to be within a sight range before the user wants to turn on the smart wearable device for certain operations, the at least two screen display regions are required to satisfy the following condition: when the user is wearing the smart wearable device, the screen display regions are not simultaneously in the same plane. In an example, referring to FIG. 1B, the smart wearable device includes two independent display screens. When the user is wearing the smart wearable device, one of the independent display screens is located at the top of the wrist, and the other independent display screen is located at the bottom of the wrist. In another example, the smart wearable device may include a display screen, and the display screen has three screen display regions. When the user is wearing the smart wearable device, one of the screen display regions is located at the top of the wrist, the second screen display region is located at the front of the wrist, and the last screen display region is located at the bottom of the wrist.

Figure 2:
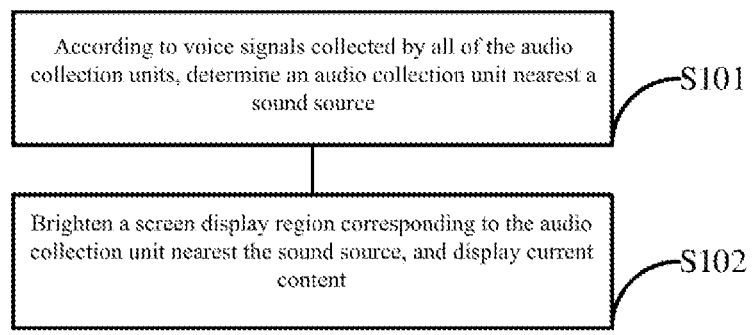
FIG. 2 is a flowchart of a display method according to an example embodiment of the present disclosure.

As shown in FIG. 2, FIG. 2 is a flowchart of a display method according to an example embodiment of the present disclosure. The method includes the following steps.

In step S101, according to voice signals collected by all audio collection units, an audio collection unit nearest a sound source is determined.

In step S102, a screen display region corresponding to the audio collection unit nearest the sound source is turned on to display current content.

In the embodiments of the present disclosure, after the audio collection units collect the voice signals, the smart wearable device determines the audio collection unit nearest the sound source based on the voice signals collected by all of the audio collection units, thereby turning on the screen display region corresponding to the audio collection unit nearest the sound source, while keeping other screen display regions turned off to realize a process of automatically turning on a screen by sensing of orientation of a user based on sound, so that the use experience of the user is improved.

In step S101, after the audio collection units collect the voice signals, the smart wearable device determines the audio collection unit nearest the sound source according to the voice signals collected by all of the audio collection units, wherein the voice signals may be the collected user's sound of breathing, any voice, or the sound of tapping the screen, or the like.

Figure 3:
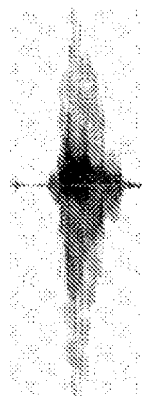
FIG. 3 is a schematic diagram of a voice signal generated by a blowing event of a user according to an example embodiment of the present disclosure.

In an embodiment, the smart wearable device measures, by calculating preset parameters of the voice signals, whether the voice signals collected by the audio collection units are strong or weak or whether the voice is received, thereby determining which microphone the user is speaking into. The preset parameters may be parameters related to the energy of the voice signals, such as the average energy or the highest energy of the voice signals. Alternatively, as shown in FIG. 3, FIG. 3 is a schematic diagram of a voice signal generated by a blowing event of a user. The figure shows the amplitude change of the voice signal, so the preset parameter may also be a parameter related to the amplitude of the voice signal, such as, the maximum amplitude or the $N^{th}$ power of the amplitude, where N is an integer greater than 1. Therefore, the smart wearable device respectively calculates the preset parameter of the voice signal collected by each audio collection unit, and then determine the audio collection unit nearest the sound source based on the preset parameter.

In an implementation, taking the smart wearable device to calculate the amplitude of each voice signal as an example for description, the smart wearable device first converts the voice signals (non-electric signals, analog signals) collected by the audio collection units into electrical signals (discrete signals), and then samples the largest amplitude from the electrical signals as the preset parameter.

In another implementation, taking the smart wearable device to calculate the average energy of each voice signal as an example for description, the smart wearable device first converts the voice signals (non-electric signals, analog signals) collected by the audio collection units into electrical signals (discrete signals), and then calculates the energy of the voice signals collected by the audio collection units based on the amplitudes sampled from the electrical signals. For example, n amplitudes (n≥1) are sampled from the electrical signal, for example, one amplitude is sampled at the same time interval until n amplitudes are sampled, and then the average energy of the voice signals is calculated based on the sampled n amplitudes. For example, suppose the energy of the voice signals collected by the audio collection units is E, and the amplitude is x, then $$E = \sqrt{\frac{\sum_{i=1}^{n} x^2}{n}}.$$

The average energy of the voice signal is calculated by means of the n sampled amplitudes as a preset parameter, thereby ensuring the correctness of the calculated signal energy.

In addition, to further improve the accuracy of the calculated preset parameters of the signals, it is also possible to first denoise the voice signals, for example, based on multiwavelet transform, it is possible to expand noisy data into a multiwavelet series by means of the multiwavelet transform, then extract "important" multiwavelet coefficients by means of a threshold method, and subject the denoised multiwavelet coefficients to multiwavelet inverse transform to reconstruct the signals, thereby realizing optimization processing of the voice signals.

Subsequently, after determining the preset parameter of the voice signal collected by each audio collection unit, the smart wearable device can determine the audio collection unit nearest the sound source based on the value of the preset parameter of the voice signal collected by each audio collection unit. Specifically, if the smart wearable device determines that the value of the preset parameter corresponding to the audio collection unit is greater than a preset threshold and has the largest difference from the preset threshold, the audio collection unit is determined as the audio collection unit nearest the sound source. It can be understood that the embodiments of the present disclosure do not impose any limitations to the specific value of the threshold, which can be specifically set according to actual situations.

In step S102, after determining the audio collection unit near the sound source, the smart wearable device can obtain the screen display region corresponding to the sound audio collection unit nearest the sound source based on the one-to-one correspondence between the audio collection units and the screen display regions, and then turn on the screen display region to display the current content, while keep other screen display regions dark (i.e., turned off), to achieve the purpose of energy saving. The embodiments of the present disclosure realize a process of automatically turning on a screen by sensing of orientation of a user based on sound, without requiring the user to perform other manual operations, so that the use experience of the user is improved.

Figure 4:
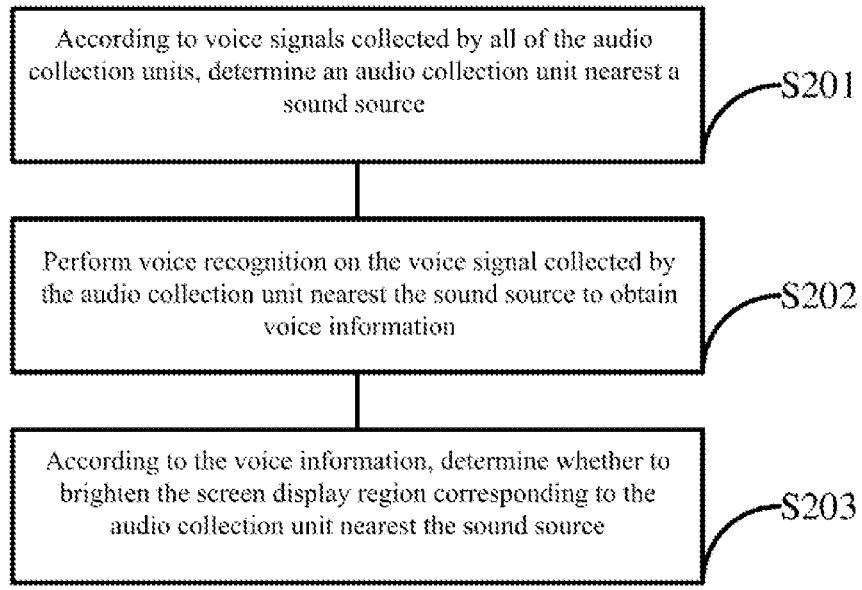
FIG. 4 is a flowchart of another display method according to an example embodiment of the present disclosure.

FIG. 4 is another flowchart of a display method according to an example embodiment of the present disclosure. FIG. 4 describes the solution of the present disclosure in more detail relative to FIG. 2.

As shown in FIG. 4, the display method may be applied to the smart wearable device. The smart wearable device includes at least two screen display regions and at least two corresponding audio collection units. Moreover, when a user is wearing the smart wearable device, the screen display regions are not simultaneously in the same plane.

The display method includes the following steps:

In step S201, according to voice signals collected by all of the audio collection units, an audio collection unit that is nearest to a sound source is determined. This step is similar to step S101 in FIG. 2, and is not detailed herein again.

In step S202, voice recognition is performed on the voice signal collected by the audio collection unit nearest to the sound source to obtain voice information.

In step S203, according to the voice information, whether to turn on the screen display region corresponding to the audio collection unit nearest the sound source is determined.

In some embodiments of the present disclosure, after determining the audio collection unit nearest to the sound source, the smart wearable device further performs voice recognition on the voice signal collected by the audio collection unit nearest to the sound source to obtain voice information, and then determines, based on the voice information, whether to turn on the screen display region corresponding to the audio collection unit nearest to the sound source. Thus, by making clear the turning on intention of the user, undesirable scenarios such as accidental turning on are avoided, which improves the turning on accuracy rate.

In step S202, after determining the audio collection unit nearest to the sound source, the smart wearable device performs voice recognition on the voice signal collected by the audio collection unit nearest to the sound source to obtain voice information. Specifically, the smart wearable device performs spectrum analysis on the voice signal, then extracts voice features from the voice signal, and performs voice recognition based on the voice features, thereby obtaining the voice information.

In an implementation, a voice recognition model is established in advance, and then the smart wearable device, after acquiring the voice features, inputs the voice features into the voice recognition model, so that the voice recognition model outputs a voice recognition result (i.e., voice information). It can be understood that the embodiments of the present disclose do not impose any limitations to a training process of the voice recognition model. Algorithm and sample selections may be performed according to actual conditions of the applications. For example, the voice recognition model is generated by training based on a hidden Markov algorithm, a support vector machine algorithm, or a random forest algorithm, etc.

In step S203, after obtaining the voice information, the smart wearable device can determine, based on the voice information, whether to turn on the screen display region corresponding to the audio collection unit nearest to the sound source, so as to avoid accidental turning on phenomena, and improve the turning on accuracy rate.

In a possible implementation, the smart wearable device can first determine whether the voice message includes keywords related to screen turning on or keywords indicating a screen turning on intention, such as, for example, "turn on the screen," "turn on the screen," or "I want to view (or read) the information." If yes, the smart wearable device turns on the screen display region corresponding to a microphone nearest to the sound source and displays the current content, while keeps other screen display regions turned off. If such keyword is not determined from the voice message, no screen display region is turned on. Therefore, the embodiments of the present disclosure can realize the process of turning on a screen by voice interaction with the user, so as to make clear whether the user intends to turn on the screen, and thus improve the use experience of the user.

In another possible implementation, the smart wearable device compares the voice message with preset text information: in case the voice information matches the preset text information, turns on the screen display region corresponding to the audio collection unit nearest the sound source and keeps other screen display regions turned off, and in case the voice information does not match the preset text information, refrain from turning on the corresponding screen display region. In the embodiments of the present disclosure, whether to turn on the screen is determined based on the matching of the voice information, so as to avoid the occurrence of accidental turning on phenomena, which improves the use experience of the user. It can be understood that the embodiments of the present disclosure do not impose any limitations to the content of the preset text information, which can be specifically set according to actual situations. For example, the preset text information may be a name (such as the name of a virtual assistant) and the like.

Figure 5:
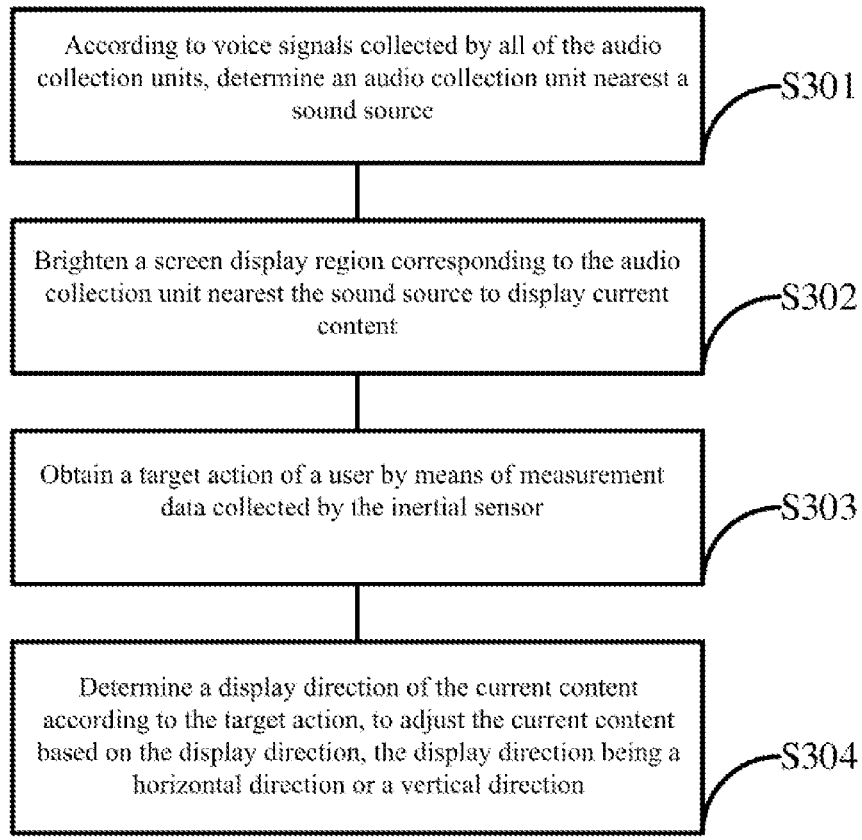
FIG. 5 is a third flowchart of a display method according to an example embodiment of the present disclosure.

FIG. 5 is a third flowchart of a display method according to an example embodiment of the present disclosure. The display method is applied to a smart wearable device. The smart wearable device further includes inertial sensors. The inertial sensors are configured to detect and measure acceleration, tilt, shock, vibration, rotation, and multi-degree of freedom (DoF) motion. The inertial sensors include an accelerometer (or an acceleration sensor) and an angular velocity sensor (a gyro) and their single-, dual-, and three-axis combined inertial measurement unit (IMU). It can be understood that the present disclosure does not impose any limitations to the specific types and models of the inertial sensors. For example, the inertial sensors are divided into two categories: one is an angular velocity gyroscope, and the other is an acceleration sensor. The angular velocity gyroscope may be a mechanical, dry liquid floated, semi-liquid floated or air floated angular rate gyroscope, or a fiber angular rate gyroscope, or the like. The acceleration sensor may be a mechanical linear accelerometer, a flexible linear accelerometer, or the like.

In the embodiment shown in FIG. 5, the display method includes the following steps.

In step S301, according to voice signals collected by all audio collection units, an audio collection unit that is nearest to a sound source is determined. This step is similar to step S101 in FIG. 2, and is not detailed herein again.

In step S302, a screen display region corresponding to the audio collection unit nearest to the sound source is turned on, and current content is displayed on the screen display region. This step is similar to step S102 in FIG. 2, and is not detailed herein again.

In step S303, a target action of a user is obtained by means of measurement data collected by the inertial sensor.

In step S304, a display direction of the current content is determined according to the target action, to adjust the current content based on the display direction, the display direction being a horizontal direction or a vertical direction.

In some embodiments of the present disclosure, the display direction of the current content is determined according to the target action of the user, and then the current content is adjusted to facilitate the viewing of the user. It should be noted that the target action may be a wrist turning action. The wrist turning action can include, for example, two situations. One is wrist turning in the vertical direction, that is, an arm of the user is turned from a horizontal direction parallel to the ground to a vertical direction perpendicular to the ground. The second is wrist turning in the horizontal direction, that is, the arm of the user is turned from a horizontal direction parallel to the body to a vertical direction perpendicular to the body (it should be noted that the vertical direction perpendicular to the body is not completely parallel to the ground direction, and may have a certain included angle with the ground, and the angle is less than 90°).

Figure 6:
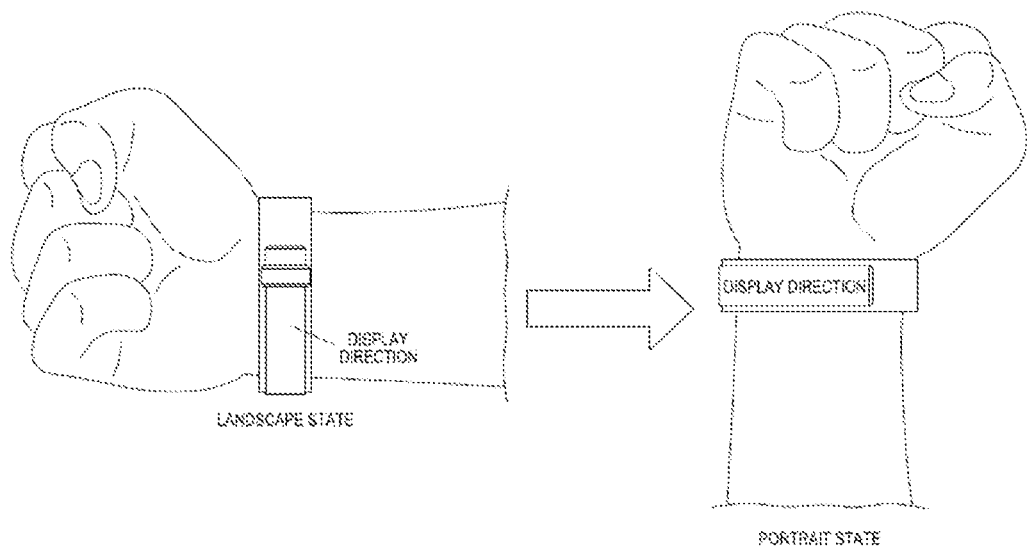
FIG. 6 is a schematic diagram of changing a content display direction when a user wears the smart wearable device and turns the wrist according to an example embodiment of the present disclosure.

In an example, referring to FIG. 6, after the user wears the smart wearable device (taking a wristband as an example for description in FIG. 6) and turns the wrist, in case the arm of the user is turned from the horizontal direction parallel to the ground to the vertical direction perpendicular to the ground, or from the horizontal direction parallel to the body to the vertical direction perpendicular to the body, the smart wearable device adjusts the current content in the turned on screen display region to the vertical direction ("portrait state"). If the arm of the user is turned from the vertical direction perpendicular to the ground to the horizontal direction parallel to the ground, or from the vertical direction perpendicular to the body to the horizontal direction parallel to the body, the smart wearable device adjusts the current content of the turned on screen display region to the horizontal direction ("landscape state").

For step S302, the smart wearable device can obtain the wrist turning action of the user according to Z-axis angular velocity data in the three-dimensional coordinate system measured by the inertial sensor. It should be noted that, based on the actual situation of the user, for the wrist turning action in the present disclosure, only the wrist turning action with the palm of the hand up is considered in the embodiment. Other wrist turning actions can also be considered.

Figure 7:
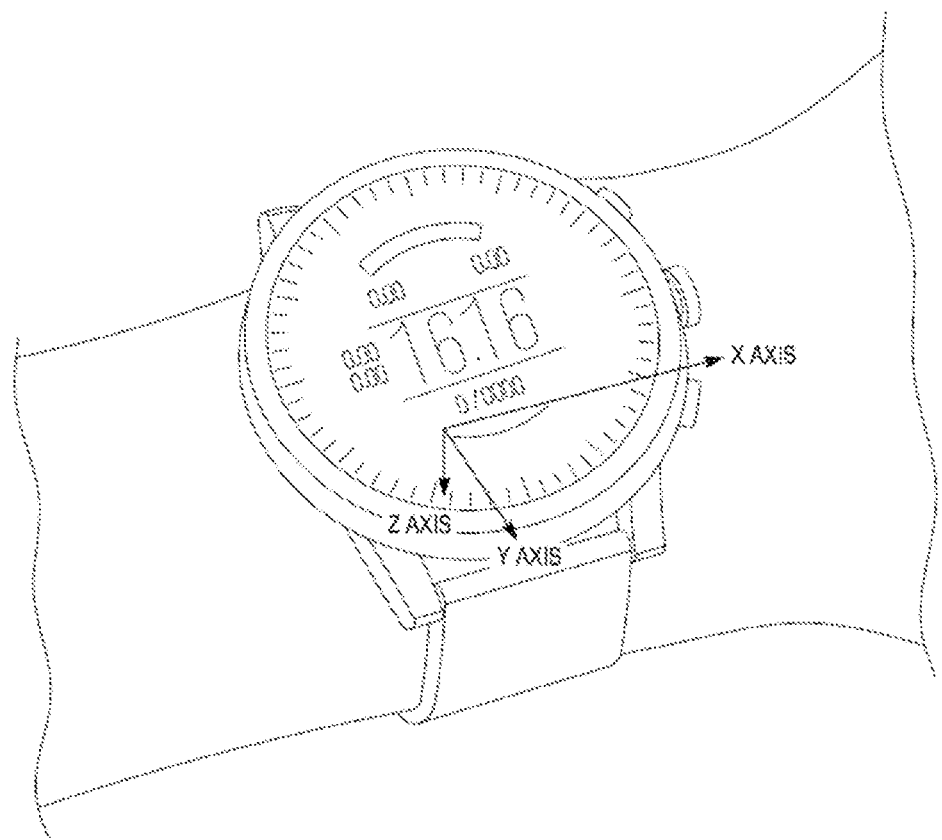
FIG. 7 is a schematic diagram of example orientations of a three-dimensional coordinate system according to an example embodiment of the present disclosure.
Figure 8A:
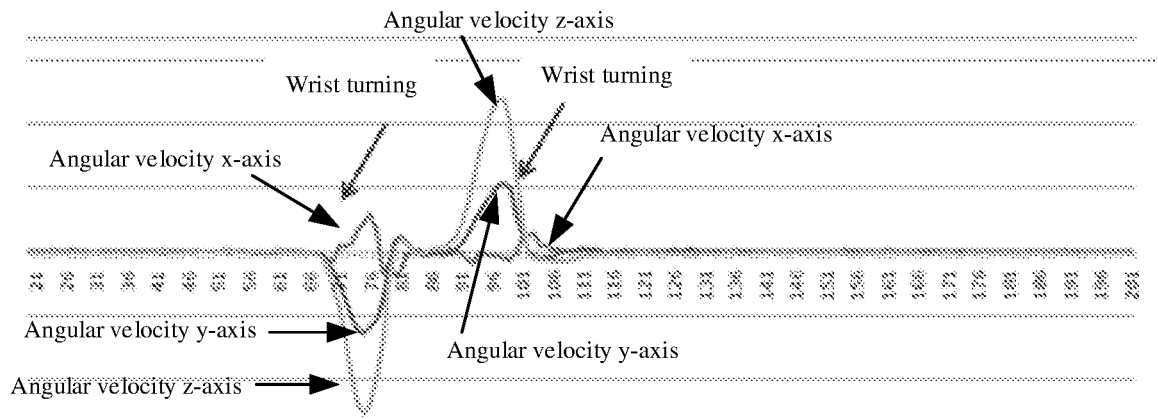
FIG. 8A is a schematic diagram of three-axis angular velocity data waveforms when turning the wrist in a vertical direction according to an example embodiment of the present disclosure.
Figure 9A:
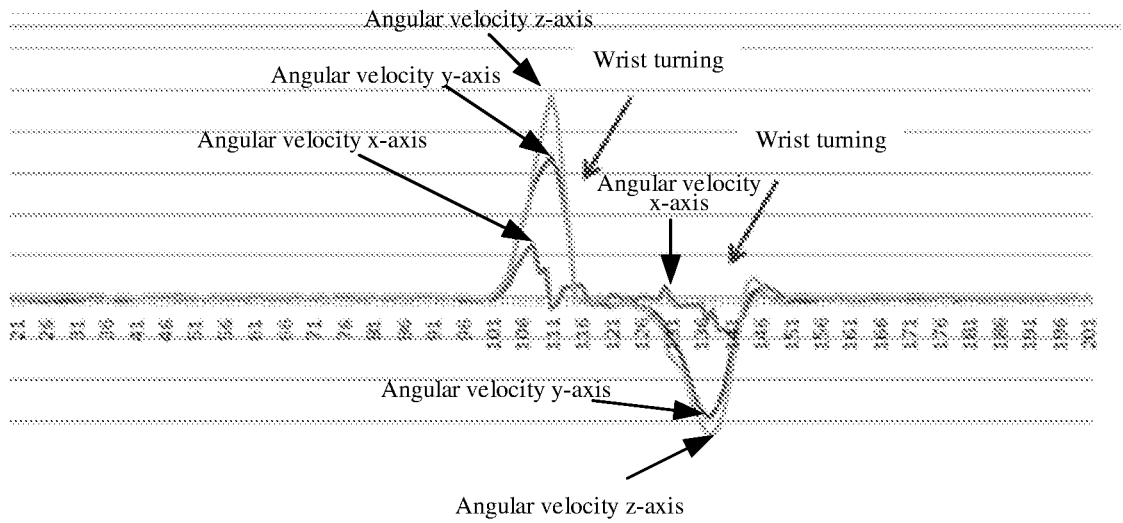
FIG. 9A is a schematic diagram of three-axis angular velocity data waveforms when turning the wrist in a horizontal direction according to an example embodiment of the present disclosure.

In an example, in the three-dimensional coordinate system shown in FIG. 7, in the case that the smart wearable device is worn on the left hand of the user, and the display screen of the smart wearable device is parallel to the ground, the plane formed by a Y axis and an X axis is parallel to the plane formed by the display screen, and the X axis is parallel to the arm and the direction of the X axis corresponds to a text display direction (such as from left to right). The Y axis is perpendicular to the arm and the direction thereof points to the side where the body is located. A Z axis is perpendicular to the plane formed by the X axis and the Y axis, and is the same as a direction of gravitational acceleration. It should be noted that the orientations of the three-dimensional coordinate system when the dial of the watch is worn on the palm of the hand in FIG. 7 are taken as an example for description. In the example, in the orientations of the three-dimensional coordinate system defined in FIG. 7, refer to FIG. 8A and FIG. 9A. FIG. 8A is a diagram of three-axis angular velocity data waveforms when turning the wrist in a vertical direction. FIG. 9A is a diagram of three-axis angular velocity data waveforms when turning the wrist in a horizontal direction.

It can be seen that when the user wears the smart wearable device on the right hand, and performs a first wrist turning action with the palm of the hand up, refer to the first wrist turning change trend in FIG. 8A and FIG. 9A. According to FIG. 8A (the arm of the user is turned from the vertical direction perpendicular to the ground to the horizontal direction parallel to the ground), the Z-axis angular velocity shows a certain counterclockwise rotation angle, such as 80°-90° (negative pulse). According to FIG. 9A (in the horizontal direction, the arm of the user is turned from the vertical direction perpendicular to the body to the horizontal direction parallel to the body), the Z-axis angular velocity shows a certain clockwise rotation angle (positive pulse).

When the user wears the smart wearable device on the right hand, and performs a second wrist turning action with the palm of the hand up, refer to the second wrist turning change trend in FIG. 8A and FIG. 9A. In FIG. 8A (the arm of the user is turned from the horizontal direction parallel to the ground to the vertical direction perpendicular to the ground), the Z-axis angular velocity shows a certain clockwise rotation angle, such as 80°-90° (positive pulse). In FIG. 9A (in the horizontal direction, the arm of the user is turned from the horizontal direction parallel to the body to the vertical direction perpendicular to the body), the Z-axis angular velocity shows a certain counterclockwise rotation angle (negative pulse).

When the user wears the smart wearable device on the left hand and performs a wrist turning action with the palm of the hand up, in case the wrist turning action is in the vertical direction, the arm of the user is turned from the vertical direction perpendicular to the ground to the horizontal direction parallel to the ground, and the Z-axis angular velocity shows a clockwise rotation trend ("positive pulse"); when the arm of the user is turned from the horizontal direction parallel to the ground to the vertical direction perpendicular to the ground, the Z-axis angular velocity shows a counterclockwise rotation trend (negative pulse). If the wrist turning action is in the horizontal direction, the arm of the user is turned from the vertical direction perpendicular to the body to the horizontal direction parallel to the body, and the Z-axis angular velocity shows a counterclockwise rotation trend (negative pulse); when the arm of the user is turned from the horizontal direction parallel to the body to the vertical direction perpendicular to the body, the Z-axis angular velocity shows a clockwise rotation trend (positive pulse).

Therefore, without having to distinguish whether the smart wearable device is worn on the left hand or on the right hand, and without having to distinguish whether the wrist is turned in the horizontal direction or in the vertical direction, the smart wearable device can determine whether the action is a wrist turning action by determining whether the Z-axis angular velocity data is greater than or equal to a preset threshold, and if yes, determine that the current action of the user is the wrist turning action. The embodiments of the present disclosure are beneficial for improving the accuracy of action recognition. It can be understood that the present disclosure does not impose any limitations to the preset threshold, which can be specifically set according to actual situations.

Figure 8B:
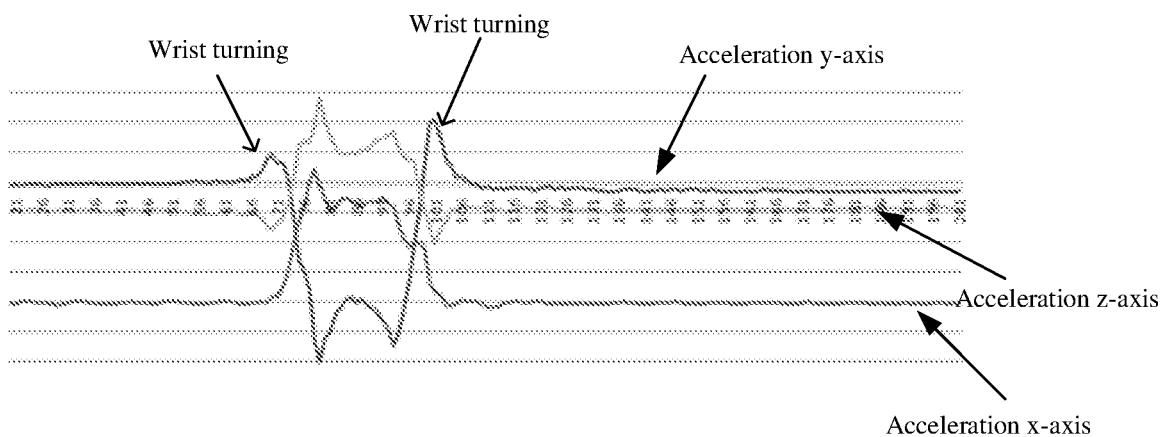
FIG. 8B is a schematic diagram of three-axis acceleration data waveforms when turning the wrist in a vertical direction according to an example embodiment of the present disclosure.
Figure 9B:
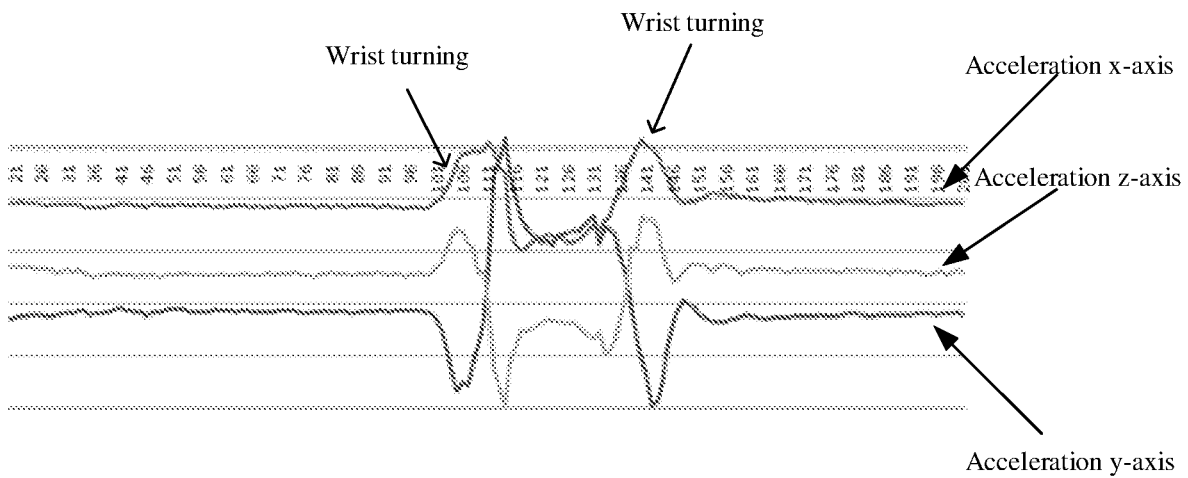
FIG. 9B is a schematic diagram of three-axis acceleration data waveforms when turning the wrist in a horizontal direction according to an example embodiment of the present disclosure.

For step S304, referring to FIG. 8B (FIG. 8B is a diagram of three-axis acceleration data waveforms when turning the wrist in a vertical direction) and FIG. 9B (FIG. 9B is a diagram of three-axis acceleration data waveforms when turning the wrist in a horizontal direction), after determining that the action is the target action, the smart wearable device can determine a turnover direction of the wrist turning action according to X-axis and Y-axis acceleration data to determine the display direction of the current content, thereby adjusting the current content according to the display direction of the current content to facilitate the reading of the user.

In an example, the user wears the smart wearable device. Assuming that the current direction is a horizontal direction parallel to the ground and parallel to the body, and the palm of the hand faces up, the screen display region corresponding to the sight range of the user is a screen display region at the bottom of the wrist. In this case, the screen display region at the bottom of the wrist is turned on, and the text display direction of the current content is the horizontal direction (landscape display). If the user performs a wrist turning action of turning to a vertical direction perpendicular to the ground or a vertical direction perpendicular to the body, and the palm of the hand faces up, the text display direction of the current content in the currently turned on screen display region at the bottom of the wrist is changed from the horizontal direction to the vertical direction (portrait display).

In another example, the user wears the smart wearable device. Assuming that the current direction is the vertical direction perpendicular to the ground and the vertical direction perpendicular to the body, and the palm of the hand faces up, the screen display region corresponding to the sight range of the user is a screen display region at the bottom of the wrist. In this case, the screen display region at the bottom of the wrist is turned on, and the text display direction of the current content is the vertical direction (portrait display). If the user performs a wrist turning action of turning to the horizontal direction parallel to the ground and parallel to the body, and the palm of the hand faces up, the text display direction of the current content in the currently turned on screen display region at the bottom of the wrist is changed from the vertical direction to the horizontal direction (landscape display).

In an embodiment, the smart wearable device can obtain the X-axis acceleration data and the Y-axis acceleration data within a preset time period, then respectively calculate the average values of the first halves and the average values of the second halves of the X-axis acceleration data and the Y-axis acceleration data in the preset time period, and finally determine the turnover direction of the wrist turning action according to signs of the average values of the first halves and the average values of the second halves of the X-axis acceleration data and the Y-axis acceleration data, the magnitude relation between the difference between the two average values of the X-axis acceleration data and a preset threshold, and the magnitude relation between the difference between the two average values of the Y-axis acceleration data and the preset threshold. The signs of the average value of the first half and the average value of the second half of the X-axis acceleration are related to the value of an included angle formed by an X-axis direction and a direction of gravitational acceleration, and the signs of the average value of the first half and the average value of the second half of the Y-axis acceleration are related to the value of an included angle formed by a Y-axis direction and the direction of gravitational acceleration.

Taking the orientations of the three-dimensional coordinate system shown in FIG. 7 as an example, it is defined that if the directions of the X-axis and Y-axis accelerations are the same as the direction of gravitational acceleration or the included angles with the direction of gravitational acceleration are less than 90°, the acceleration data is a negative value. If the included angles with the direction of gravitational acceleration are equal to 90°, the acceleration data is 0.

If the directions are opposite to the direction of gravitational acceleration or the included angles with the gravitational acceleration are greater than 90°, the smart wearable device obtains the X-axis acceleration data and the Y-axis acceleration data within a preset time period; if the average value of the first half of the X-axis acceleration data is negative, the average value of the second half is positive, and the absolute value of the difference between the two average values of the X-axis acceleration data is greater than a specified threshold, and if the average value of the first half of the Y-axis acceleration data is positive, the average value of the second half is negative, and the absolute value of the difference between the two average values of the Y-axis acceleration data is greater than the specified threshold, the smart wearable device determines that the wrist turning action is turning to the horizontal direction parallel to the ground; and if the average value of the first half of the X-axis acceleration data is positive, the average value of the second half is negative, and the absolute value of the difference between the two average values of the X-axis acceleration data is greater than the specified threshold, and if the average value of the first half of the Y-axis acceleration data is negative, the average value of the second half is positive, and the absolute value of the difference between the two average values of the Y-axis acceleration data is greater than the specified threshold, determines that the wrist turning action is turning to the vertical direction perpendicular to the ground.

Specifically, referring to FIG. 8B and FIG. 9B, suppose the average value of the first half of the X-axis acceleration data is $\overline{X}_{qian}$ and the average value of the second half is $\overline{X}_{hou}$, the average value of the first half of the Y-axis acceleration data is $\overline{Y}_{qian}$ and the average value of the second half is $\overline{Y}_{hou}$, and the preset threshold is σ. If the obtained X-axis acceleration data and Y-axis acceleration data within the preset time period include data of a first wrist turning action (the arm of the user is turned from the vertical direction perpendicular to the ground to the horizontal direction parallel to the ground, or is turned from the vertical direction perpendicular to the body to the horizontal direction parallel to the body), as shown in FIG. 8B (wrist turning in the vertical direction), the right hand of the user is in the vertical direction perpendicular to the ground before wearing the smart wearable device and performing the wrist turning action, the X axis thereof is the same as the direction of gravitational acceleration, and is a negative value; the Y axis is perpendicular to the gravitational acceleration or forms an included angle of greater than 90°, and the value is 0 or greater than 0. After the wrist turning action is performed, the X axis is perpendicular to the gravitational acceleration or forms an included angle of greater than 90°, and the value is 0 or a positive value greater than 0, the Y axis forms an included angle of less than 90° with the gravitational acceleration, and is a negative value, and the change trend of the wrist turning action in the vertical direction when wearing the smart wearable device on the left hand is the same as that in FIG. 8B. As shown in FIG. 9B (wrist turning in the horizontal direction), the X axis forms an included angle of less than 90° with the gravitational acceleration, and is a negative value, and the Y axis forms an included angle of less than 90° with the gravitational acceleration, and is a negative value. After the wrist turning action is performed, the X axis is perpendicular to the gravitational acceleration or forms an included angle of greater than 90°, and is 0 or a positive value greater than 0, the Y axis forms an included angle of less than 90° with the gravitational acceleration, and is a negative value, and the change trend of the wrist turning action in the horizontal direction when wearing the smart wearable device on the left hand is the same as that in FIG. 9B. Thus, the calculated average value of the first half of the X axis is $\overline{X}_{qian}<0$ and the average value of the second half is $\overline{X}_{hou}>0$, the calculated average value of the first half of the Y axis is $\overline{Y}_{qian}>0$ and the average value of the second half is $\overline{Y}_{hou}<0$, $\overline{X}_{hou}-\overline{X}_{qian}>\sigma$ and $\overline{Y}_{qian}-\overline{Y}_{hou}>\sigma$. In this case, it is determined that the display direction of the current content is the horizontal direction, and the current content is displayed in a landscape mode.

If the obtained Z-axis acceleration data within the preset time period includes data of a second wrist turning action (the arm of the user is turned from the horizontal direction parallel to the ground to the vertical direction perpendicular to the ground, or is turned from the horizontal direction parallel to the body to the vertical direction perpendicular to the body), as shown in FIG. 8B and FIG. 9B, the change trends of the X axis and Y axis are opposite to the change trends of the X axis and Y axis of the first wrist turning action. Thus, the calculated average value of the first half of the X-axis is $\overline{X}_{qian}>0$ and the average value of the second half is $\overline{X}_{hou}<0$, the calculated average value of the first half of the Y-axis is $\overline{Y}_{qian}<0$ and the average value of the second half is $\overline{Y}_{hou}>0$, and then $\overline{X}_{qian}-\overline{X}_{hou}>\sigma$ and $\overline{Y}_{hou}-\overline{Y}_{qian}>\sigma$. In this case, it is determined that the display direction of the current content is the vertical direction, and the current content is displayed in a portrait mode. The embodiments of the present disclosure are beneficial to improving the accuracy of direction recognition. It can be understood that the embodiments of the present disclosure do not impose any limitations to the preset time period and the specific value of the preset threshold, which can be specifically set according to actual situations.

In the embodiments of the present disclosure, the display direction of the current content is determined according to the target action, so as to adjust the current content according to the display direction, which facilitates the viewing of the user and is beneficial to improving the use experience of the user.

In some implementations of the present disclosure, by calculating a preset parameter of each voice signal, the audio collection unit nearest the sound source is determined according to the value of the preset parameter, so as to ensure the accuracy of the determination result.

In some implementations of the present disclosure, according to the magnitude relation between the data value of the preset parameter corresponding to each audio collection unit and a preset threshold, the audio collection unit nearest the sound source is determined, so as to ensure the accuracy of the determination result.

In some implementations of the present disclosure, voice recognition is further performed on the voice signal collected by the audio collection unit nearest the sound source to obtain voice information, and then whether to turn on the screen is determined according to the voice information, so as to make clear the turning on intention of the user, avoid accidental turning on phenomena, and improve the turning on accuracy rate.

In some implementations of the present disclosure, a specific implementation of turning on a screen is provided. Only when the voice information matches preset text information, the corresponding screen display region is turned on, so as to avoid accidental turning on phenomena, and improve the turning on accuracy rate, thereby improving the use experience of the user.

In some implementations of the present disclosure, the smart wearable device further includes an inertial sensor.

The smart wearable device can determine the action of the user according to the data collected by the inertial sensor, and then determine whether to adjust the display direction of the current content, so that the user can see the display content displayed in an arrangement mode that conforms to the text reading habits of the user no matter from which angle the user reads the display content, thereby helping to improve the use experience of the user.

Corresponding to the embodiments of the foregoing display method, the present disclosure further provides embodiments of a display apparatus and a smart wearable device to which the display apparatus is applied.

Figure 10:
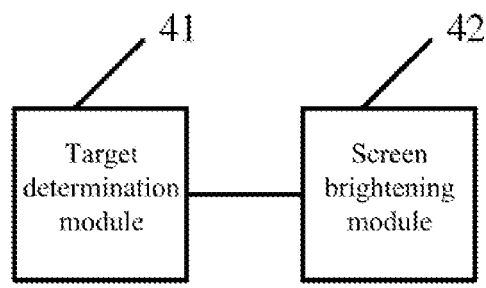
FIG. 10 is a structural block diagram of a display apparatus according to an example embodiment of the present disclosure.

As shown in FIG. 10, FIG. 10 is a structural block diagram of a display apparatus according to an example embodiment of the present disclosure. The apparatus is applied to a smart wearable device. The smart wearable device includes at least two screen display regions and at least two corresponding audio collection units. When a user is wearing the smart wearable device, the screen display regions are not simultaneously in the same plane.

The display apparatus includes a target determination module 41 and a screen turning on module 42.

The audio collection units are configured to collect voice signals.

The target determination module 41 is configured to determine, according to the voice signals collected by all of the audio collection units, an audio collection unit nearest a sound source.

The screen turning on module 42 is configured to turn on a screen display region corresponding to the audio collection unit nearest the sound source to display current content.

Optionally, the target determination module 41 includes:
a parameter calculation unit configured to respectively calculate a preset parameter of the voice signal collected by each audio collection unit, the parameter being a parameter related to the energy of the voice signal or a parameter related to the amplitude of the voice signal; and
a target determination unit configured to determine the audio collection unit nearest the sound source according to the preset parameter.

Optionally, the target determination unit is specifically configured to:
if the value of the preset parameter corresponding to the audio collection unit is greater than a preset threshold and has the largest difference from the preset threshold, determine the audio collection unit as the audio collection unit nearest the sound source.

Figure 11:
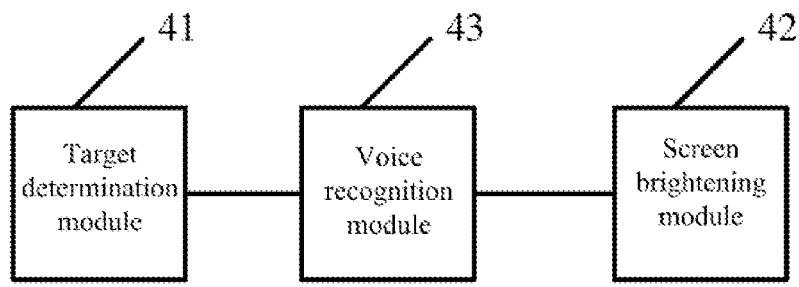
FIG. 11 is a structural block diagram of another display apparatus according to an example embodiment of the present disclosure.

As shown in FIG. 11, FIG. 11 is a block diagram of another display apparatus according to an example embodiment of the present disclosure. Given this embodiment, on the basis of the embodiment shown in FIG. 10, the display apparatus further includes:
a voice recognition module 43 configured to perform voice recognition on the voice signal collected by the audio collection unit nearest the sound source to obtain voice information.

In this embodiment, the screen turning on module 42 is specifically configured to:
according to the voice information, determine whether to turn on the screen display region corresponding to the audio collection unit nearest the sound source.

Optionally, the screen turning on module 42 includes:
a screen turning on unit configured to, if the voice information matches preset text information, turn on the corresponding screen display region; and
a screen darkening unit configured to, if the voice information does not match the preset text information, not turn on the corresponding screen display region.

Optionally, the smart wearable device further includes an inertial sensor.

The display apparatus further includes:
a target action obtaining module configured to obtain a target action of a user by means of measurement data collected by the inertial sensor; and
a content display direction adjustment module configured to determine a display direction of the current content according to the target action, to adjust the current content based on the display direction, the display direction being a horizontal direction or a vertical direction.

For an implementation process of functions and effects of modules in the foregoing display apparatus, please refer to an implementation process of corresponding steps in the foregoing display method for details, which are not described herein again.

Because the apparatus embodiments basically correspond to the method embodiments, for related parts, reference may be made to a part of the description in the method embodiments. The apparatus embodiments described above are merely examples. The modules described as separate parts may or may not be physically separate, and parts displayed as modules may or may not be physical modules, i.e., may be located in one position, or may be distributed on a plurality of network modules. Some or all of the modules may be selected according to actual requirements to achieve the objectives of the solutions of the present disclosure. A person of ordinary skill in the art may understand and implement the embodiments of the present invention without involving creative efforts.

Accordingly, the present disclosure also provides a smart wearable device, including:
a processor;
a storage configured to store instructions executable by the processor; and
at least two screen display regions and at least two corresponding audio collection units;
wherein
the audio collection units are configured to collect voice signals; and
the processor is configured to perform operations in the foregoing display method.

Figure 12:
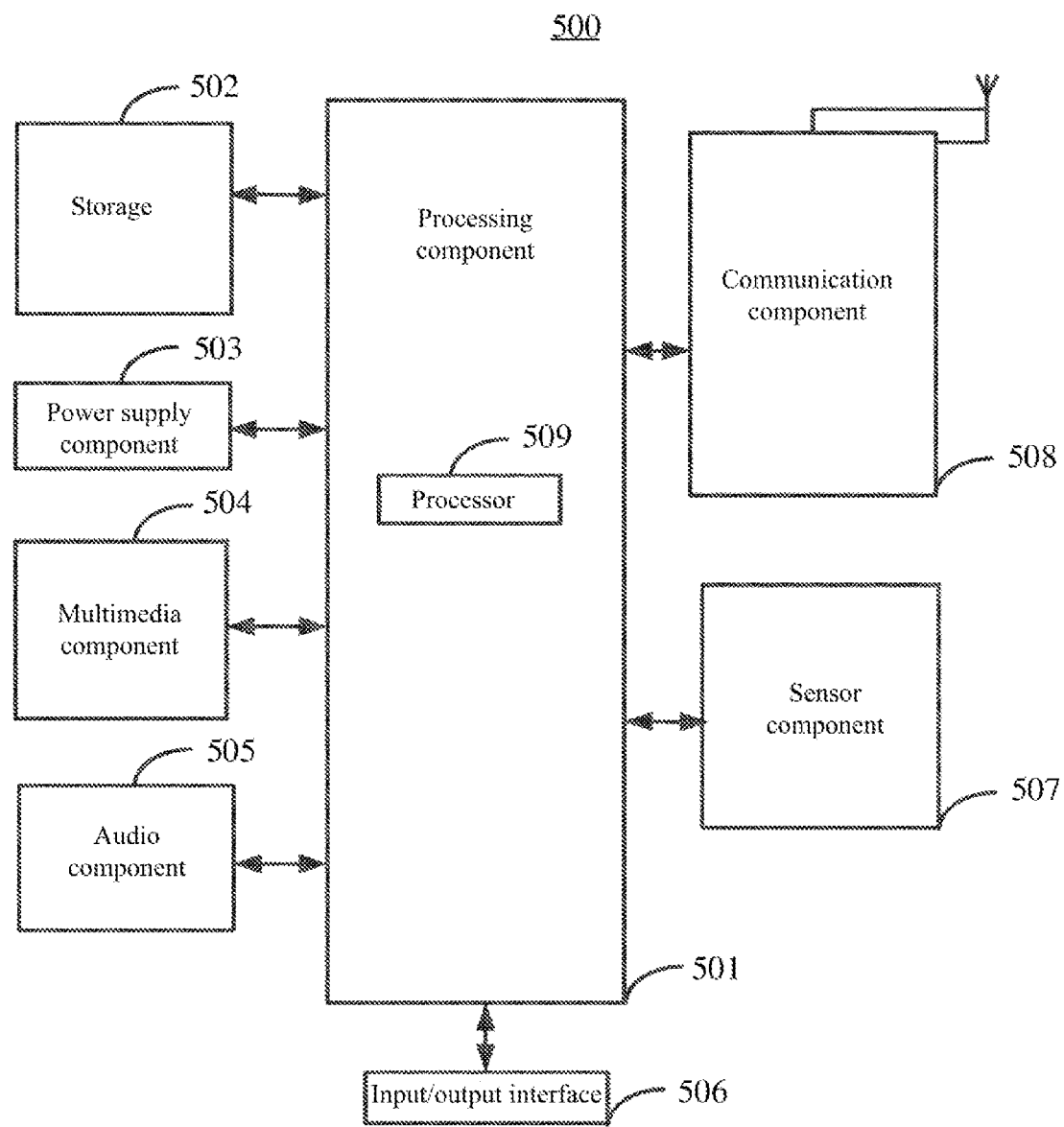
FIG. 12 is an architecture diagram of a smart wearable device according to an example embodiment of the present disclosure.

FIG. 12 is a schematic structural diagram of an apparatus 500 (such as a smart wearable device) to which a display apparatus is applied according to an example embodiment.

A shown in FIG. 12, a smart wearable device 500 according to an example embodiment is shown. The smart wearable device 500 may be a smart wearable device such as a wristband, a watch, a wristband, a chest strap, a finger ring, or a leg ring.

Referring to FIG. 12, the smart wearable device 500 may include one or more of the following components: a processing component 501, a storage 502, a power supply component 503, a multimedia component 504, an audio component 505, an Input/Output (I/O) interface 506, a sensor component 507, and a communication component 508.

The processing component 501 generally controls overall operations of the apparatus 500, such as operations associated with display, telephone calls, data communications, camera operations, and recording operations. The processing component 501 may include one or more processors 509 to execute instructions to implement all or some of the steps of the foregoing method. In addition, the processing component 501 may include one or more modules to facilitate interaction between the processing component 501 and other components. For example, the processing component 501 may include a multimedia module to facilitate interaction between the multimedia component 505 and the processing component 501.

The storage 502 is configured to store various types of data to support operations on the smart wearable device 500. Examples of the data include instructions for any application program or method operated on the smart wearable device 500, contact data, contact list data, messages, pictures, videos, and the like. The storage 502 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk.

The power supply component 503 provides power for various components of the smart wearable device 500. The power supply component 503 may include a power management system, one or more power supplies, and other components associated with power generation, management, and distribution for the smart wearable device 500.

The multimedia component 504 includes a screen that provides an output interface between the smart wearable device 500 and a user. In some embodiments, the screen may include a Liquid Crystal Display (LCD) and a Touch Panel (TP). If the screen includes a TP, the screen may be implemented as a touch screen to receive input signals from the user. The TP includes one or more touch sensors to sense touches, swipes, and gestures on the TP. The touch sensor may not only sense the boundary of a touch or swipe action, but also detect the duration and pressure related to the touch or swipe operation. In some embodiments, the multimedia component 504 includes a front camera and/or a rear camera. When the smart wearable device 500 is in an operation mode, such as, a photographing mode or a video mode, the front camera and/or the rear camera may receive external multimedia data. Each of the front camera and the rear camera may be a fixed optical lens system, or have focus and optical zoom capability.

The audio component 505 is configured to output and/or input an audio signal. For example, the audio component 505 includes a microphone (MIC), and when the smart wearable device 500 is in an operation mode, such as a calling mode, a recording mode, and a voice recognition mode, the microphone is configured to receive an external audio signal. The received audio signal may be further stored in the storage 502 or transmitted by means of the communication component 508. In some embodiments, the audio component 505 further includes a speaker for outputting the audio signal.

The I/O interface 506 provides an interface between the processing component 501 and a peripheral interface module, which may be a keyboard, a click wheel, a button, or the like. The button may include, but is not limited to, a home button, a volume button, a start button, and a lock button.

The sensor component 507 includes one or more sensors for providing state assessment in various aspects for the smart wearable device 500. For example, the sensor component 507 may detect an on/off state of the smart wearable device 500, and relative positioning of components. For example, the components are the display and keypad of the smart wearable device 500. The sensor component 507 may further detect a position change of the smart wearable device 500 or a component of the smart wearable device 500, the presence or absence of contact of the user with the smart wearable device 500, the orientation or acceleration/deceleration of the smart wearable device 500, and a temperature change of the smart wearable device 500. The sensor component 507 may include a proximity sensor, which is configured to detect the presence of a nearby object without any physical contact. The sensor component 507 may further include a light sensor, such as a CMOS or CCD image sensor, for use in an imaging application. In some embodiments, the sensor component 507 may further include an acceleration sensor, a gyroscope sensor, a magnetic sensor, a pressure sensor, a heart rate signal sensor, an electrocardiography sensor, a fingerprint sensor, or a temperature sensor.

The communication component 508 is configured to facilitate wired or wireless communications between the smart wearable device 500 and other devices. The smart wearable device 500 may access a wireless network based on a communication standard, such as WiFi, 2G, or 3G, or a combination thereof. In one example embodiment, the communication component 508 receives a broadcast signal or broadcast-related information from an external broadcast management system by means of a broadcast channel. In an example embodiment, the communication component 508 further includes a Near Field Communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example embodiment, the smart wearable device 500 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the foregoing method.

In an example embodiment, a non-transitory computer-readable storage medium including instructions is also provided, such as a storage 502 including instructions. The instructions are executable by the processor 509 of the smart wearable device 500 to implement the foregoing method. For example, the non-transitory computer-readable storage medium may be a ROM, a random access memory (RAM), a CD-ROM, a magnetic tape, a floppy disk, an optical data storage device, and the like.

The instructions in the storage medium are executed by the processor 509, the device 500 is enabled to perform the foregoing display method.

Other embodiments of the present disclosure will be apparent to a person skilled in the art from consideration of the specification and practice of the invention disclosed herein. The present disclosure is intended to cover any variations, functions, or adaptive changes of the present disclosure. These variations, uses, or adaptive changes comply with general principles of the present disclosure, and include common knowledge or a customary technical means in the technical field that is not disclosed in the present disclosure. The specification and the embodiments are merely considered to be examples, and the actual scope and spirit of the present disclosure are pointed out by the following claims.

It should be understood that the present disclosure is not limited to the exact structure that has been described above and illustrated in the accompanying drawings, and that various modifications and changes can be made without departing from the scope thereof. The scope of the present disclosure is only defined by the appended claims.

The above descriptions are merely example embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A display method for a wearable device comprising at least two screen display regions and at least two audio collection units, the display method comprising:
   according to voice signals collected by the at least two audio collection units, determining, from the at least two audio collection units, an audio collection unit nearest to a sound source associated with the voice signals; and
   turning on a corresponding one of the at least two screen display regions corresponding to the audio collection unit nearest to the sound source to display current content,
   wherein when a user is wearing the wearable device, the at least two screen display regions are not simultaneously in the same plane.

2. The display method according to claim 1, wherein the according to voice signals collected by the at least two audio collection units, determining, from the at least two audio collection units, the audio collection unit nearest to the sound source comprises:
   calculating, for each voice signal collected by a respective audio collection unit, a preset parameter of the voice signal, the preset parameter being a parameter related to the energy or the amplitude of the voice signal; and
   determining the audio collection unit nearest to the sound source according to the preset parameters.

3. The display method according to claim 2, wherein the determining the audio collection unit nearest to the sound source according to the preset parameters comprises:
   in response to a value of the preset parameter corresponding to one of the at least two audio collection units being greater than a preset threshold and having the largest difference from the preset threshold, determining the one of the at least two audio collection units as the audio collection unit nearest to the sound source.

4. The display method according to claim 1, further comprising:
   after the determining the audio collection unit nearest to the sound source, performing voice recognition on the voice signal collected by the audio collection unit nearest to the sound source to obtain voice information,
   wherein the turning on the screen display region corresponding to the audio collection unit nearest to the sound source comprises:
   determining whether to turn on the corresponding one of the at least two screen display regions corresponding to the audio collection unit nearest to the sound source based on the voice information.

5. The display method according to claim 4, wherein the according to the voice information, determining whether to turn on the corresponding one of the at least two screen display regions corresponding to the audio collection unit nearest to the sound source comprises:
   in response to the voice information matching preset text information, determining to turning on a corresponding screen display region; and
   in response to the voice information not matching the preset text information, determining to refrain from turning on the corresponding screen display region.

6. The display method according to claim 1, wherein the wearable device further comprises an inertial sensor; and
   wherein the display method further comprises:
   obtaining a target action of the user using measurement data collected by the inertial sensor; and
   determining a display direction of the current content according to the target action, and adjusting the current content based on the display direction, the display direction being a horizontal direction or a vertical direction.

7. A wearable device, comprising:
   a processor;
   a storage configured to store instructions executable by the processor; and
   at least two screen display regions, and at least two corresponding audio collection units configured to collect voice signals;
   wherein the processor is configured to perform the display method according to claim 1.

8. The wearable device of claim 7, wherein the according to voice signals collected by the at least two audio collection units, determining the audio collection unit nearest to the sound source comprises:
   calculating, for each voice signal collected by a respective audio collection unit, a preset parameter of the voice signal, the preset parameter being a parameter related to the energy or the amplitude of the voice signal; and
   determining the audio collection unit nearest to the sound source according to the preset parameters.

9. The wearable device of claim 8, wherein the determining the audio collection unit nearest to the sound source according to the preset parameters comprises:
   in response to the value of the preset parameter corresponding to one of the at least two audio collection units being greater than a preset threshold and having the largest difference from the preset threshold, determining the one of the at least two audio collection units as the audio collection unit nearest to the sound source.

10. The wearable device of claim 7, further comprising:
    after the determining the audio collection unit nearest to the sound source, performing voice recognition on the voice signal collected by the audio collection unit nearest to the sound source to obtain voice information,
    wherein the turning on the corresponding one of the at least two screen display regions corresponding to the audio collection unit nearest to the sound source comprises:
    determining whether to turn on the corresponding one of the at least two screen display regions corresponding to the audio collection unit nearest to the sound source based on the voice information.

11. The wearable device of claim 10, wherein the according to the voice information, determining whether to turn on the screen display region corresponding to the audio collection unit nearest the sound source comprises:
    in response to the voice information matching preset text information, turning on the corresponding screen display region; and
    in response to the voice information not matching the preset text information, refraining from turning on the corresponding screen display region.

12. The wearable device of claim 7, wherein the wearable device further comprises an inertial sensor; and
  wherein the display method further comprises:
    obtaining a target action of the user using measurement data collected by the inertial sensor; and
    determining a display direction of the current content according to the target action, and adjusting the current content based on the display direction, the display direction being a horizontal direction or a vertical direction.

13. A non-transitory computer-readable storage medium having a computer program stored thereon, which, when executed by one or more processors, causes the one or more processors to perform the display method according to claim 1.

14. The non-transitory computer-readable storage medium of claim 13, wherein the according to voice signals collected by the at least two audio collection units, determining the audio collection unit nearest to the sound source comprises:
    calculating, for each voice signal collected by a respective audio collection unit, a preset parameter of the voice signal, the preset parameter being a parameter related to the energy or the amplitude of the voice signal; and
    determining the audio collection unit nearest to the sound source according to the preset parameters.

15. The non-transitory computer-readable storage medium of claim 14, wherein the determining the audio collection unit nearest to the sound source according to the preset parameters comprises:
    in response to the value of the preset parameter corresponding to one of the at least two audio collection units being greater than a preset threshold and having the largest difference from the preset threshold, determining the one of the at least two audio collection units as the audio collection unit nearest to the sound source.

16. The non-transitory computer-readable storage medium of claim 13, further comprising:
    after the determining the audio collection unit nearest to the sound source, performing voice recognition on the voice signal collected by the audio collection unit nearest to the sound source to obtain voice information,
    wherein the turning on the screen display region corresponding to the audio collection unit nearest to the sound source comprises:
    determining whether to turn on the screen display region corresponding to the audio collection unit nearest to the sound source based on the voice information.

17. The non-transitory computer-readable storage medium of claim 16, wherein the according to the voice information, determining whether to turn on the screen display region corresponding to the audio collection unit nearest the sound source comprises:
    in response to the voice information matching preset text information, turning on the corresponding screen display region; and
    in response to the voice information not matching the preset text information, refraining from turning on the corresponding screen display region.

18. The non-transitory computer-readable storage medium of claim 13, wherein the wearable device further comprises an inertial sensor; and
  wherein the display method further comprises:
    obtaining a target action of the user using measurement data collected by the inertial sensor; and
    determining a display direction of the current content according to the target action, and adjusting the current content based on the display direction, the display direction being a horizontal direction or a vertical direction.

19. The display method according to claim 1, wherein the wearable device further comprises an inertial sensor, and the display method further comprises:
    when the current content is displayed in the corresponding one of the at least two screen display regions corresponding to the audio collection unit nearest to the sound source, determining a wrist turning action and a turnover direction of the wrist-turning action through measurement data collected by the inertial sensor when the angular velocity of the measurement data along a first direction is greater than or equal to a preset threshold, the first direction being perpendicular to a plane where an arm of the user on which the wearable device is worn is located; and
    determine a display direction of the current content according to the wrist-turning action and the turnover direction of the wrist-turning action, so as to adjust the current content based on the display direction, wherein the display direction is a direction that conforms to the user's text reading habits.

20. The display method according to claim 19, wherein determining the turnover direction of the wrist-turning action through measurement data collected by the inertial sensor comprises determining the turnover direction of the wrist-turning action based on the measurement data along a second direction and a third direction each perpendicular to the first direction; and
    the determining the display direction of the current content according to the wrist turning action and the turnover direction of the wrist turning action comprises:
    when the arm of the user on which the wearable device is worn is turned from a horizontal direction parallel to the ground to a vertical direction perpendicular to the ground, changing the display direction of the current content from a horizontal direction to a vertical direction; and
    when the arm of the user on which the wearable device is worn is turned from a vertical direction relative to the ground to a horizontal direction parallel to the ground, changing the display direction of the current content from the vertical direction to the horizontal direction.

* * * * *